United States Patent
Koik et al.

(10) Patent No.: US 10,213,848 B2
(45) Date of Patent: Feb. 26, 2019

(54) CHIP CONTROL TOOL

(71) Applicant: SP3 CUTTING TOOLS, INC., Decatur, IN (US)

(72) Inventors: Erik Koik, Urbana, OH (US); Kirk Bennett, Tipp City, OH (US)

(73) Assignee: DECATUR DIAMOND, LLC, Decatur, IN (US)

( * ) Notice: Subject to any disclaimer, the term of this patent is extended or adjusted under 35 U.S.C. 154(b) by 1 day.

(21) Appl. No.: 15/418,818

(22) Filed: Jan. 30, 2017

(65) Prior Publication Data

US 2017/0216939 A1 Aug. 3, 2017

Related U.S. Application Data

(60) Provisional application No. 62/288,071, filed on Jan. 28, 2016.

(51) Int. Cl.
| | |
|---|---|
| *B23B 51/06* | (2006.01) |
| *B23C 5/16* | (2006.01) |
| *B23C 5/28* | (2006.01) |
| *B23D 77/00* | (2006.01) |
| *B23B 51/04* | (2006.01) |

(52) U.S. Cl.
CPC .............. *B23C 5/165* (2013.01); *B23C 5/28* (2013.01); *B23D 77/006* (2013.01); *B23B 51/042* (2013.01); *B23B 51/0486* (2013.01); *B23B 51/06* (2013.01); *B23B 2251/68* (2013.01)

(58) Field of Classification Search
CPC . B23B 51/06; B23B 51/0406; B23B 51/0413; B23B 51/042; B23B 51/0486; B23B 2251/68
See application file for complete search history.

(56) References Cited

U.S. PATENT DOCUMENTS

| | | | | |
|---|---|---|---|---|
| 111,167 A | * | 1/1871 | Bauman et al. | .... B23B 51/0486 175/404 |
| 2,854,219 A | * | 9/1958 | MacNeil | ................. E21B 10/04 175/404 |
| 3,055,443 A | * | 9/1962 | Edwards | ................. E21B 10/04 175/333 |
| 3,701,606 A | * | 10/1972 | Bogsten | .............. B23B 51/0486 408/59 |
| 4,966,503 A | * | 10/1990 | Davidson | ................ B23B 51/06 408/207 |

(Continued)

*Primary Examiner* — Daniel Howell
*Assistant Examiner* — Chwen-Wei Su
(74) *Attorney, Agent, or Firm* — Shumaker, Loop & Kendrick, LLP; James D. Miller

(57) ABSTRACT

A rotary tool comprises a cylindrical sleeve including an opening formed in an outer circumferential surface thereof providing fluid communication between a hollow interior of the sleeve and an environment surrounding the sleeve. The sleeve includes an axially extending flow passage formed therein terminating in a first fluid outlet formed in an open end of the sleeve disposed adjacent a cutting element of the rotary tool. The fluid outlet is configured to deliver a flow of a fluid toward the workpiece to cause chips formed during the machining operation to be directed away from the workpiece and out of the hollow interior of the sleeve through the opening formed in the outer circumferential surface thereof.

16 Claims, 3 Drawing Sheets

(56) References Cited

U.S. PATENT DOCUMENTS

| | | | |
|---|---|---|---|
| 5,004,382 A * | 4/1991 | Yoshino | B23B 51/042 125/20 |
| 5,092,716 A * | 3/1992 | Omi | B23D 59/025 408/204 |
| 2005/0047879 A1* | 3/2005 | Svensson | B23B 51/0486 408/59 |
| 2006/0029479 A1* | 2/2006 | Stoll | B23B 31/1179 409/136 |
| 2012/0285749 A1* | 11/2012 | Bohn | B23B 51/06 175/393 |

* cited by examiner

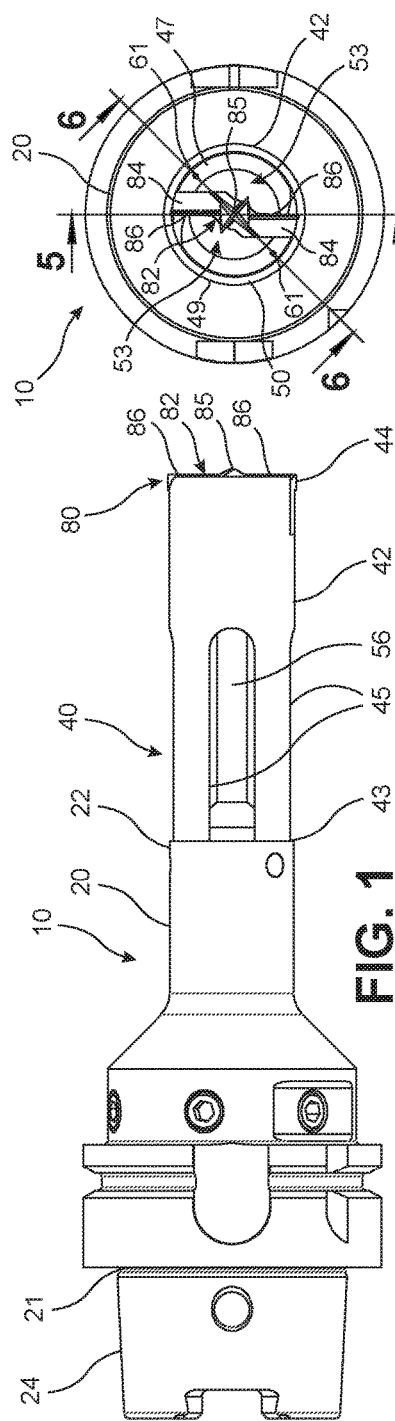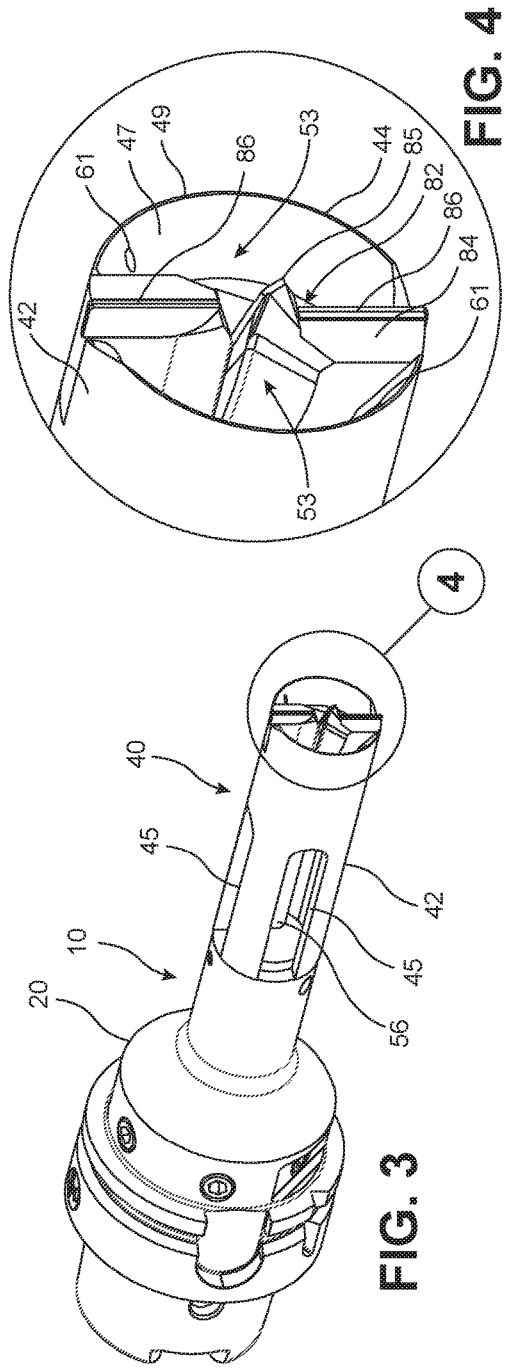

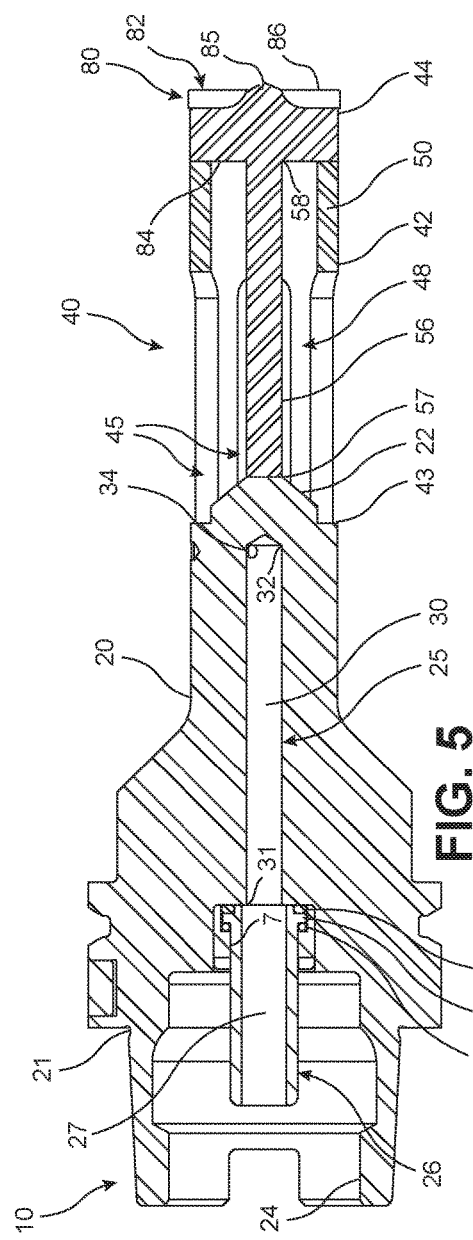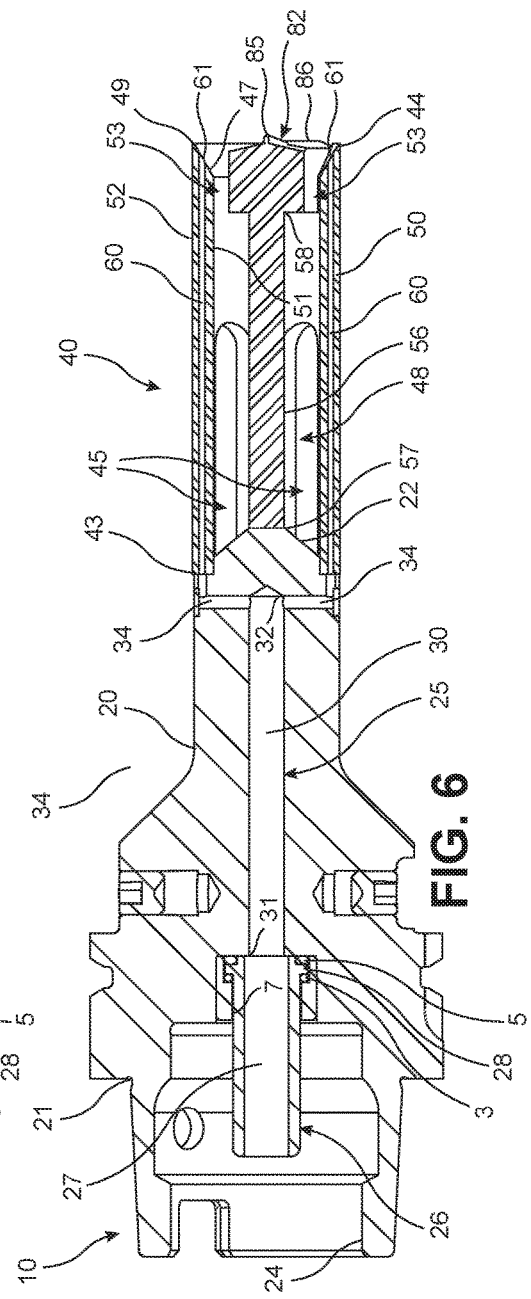

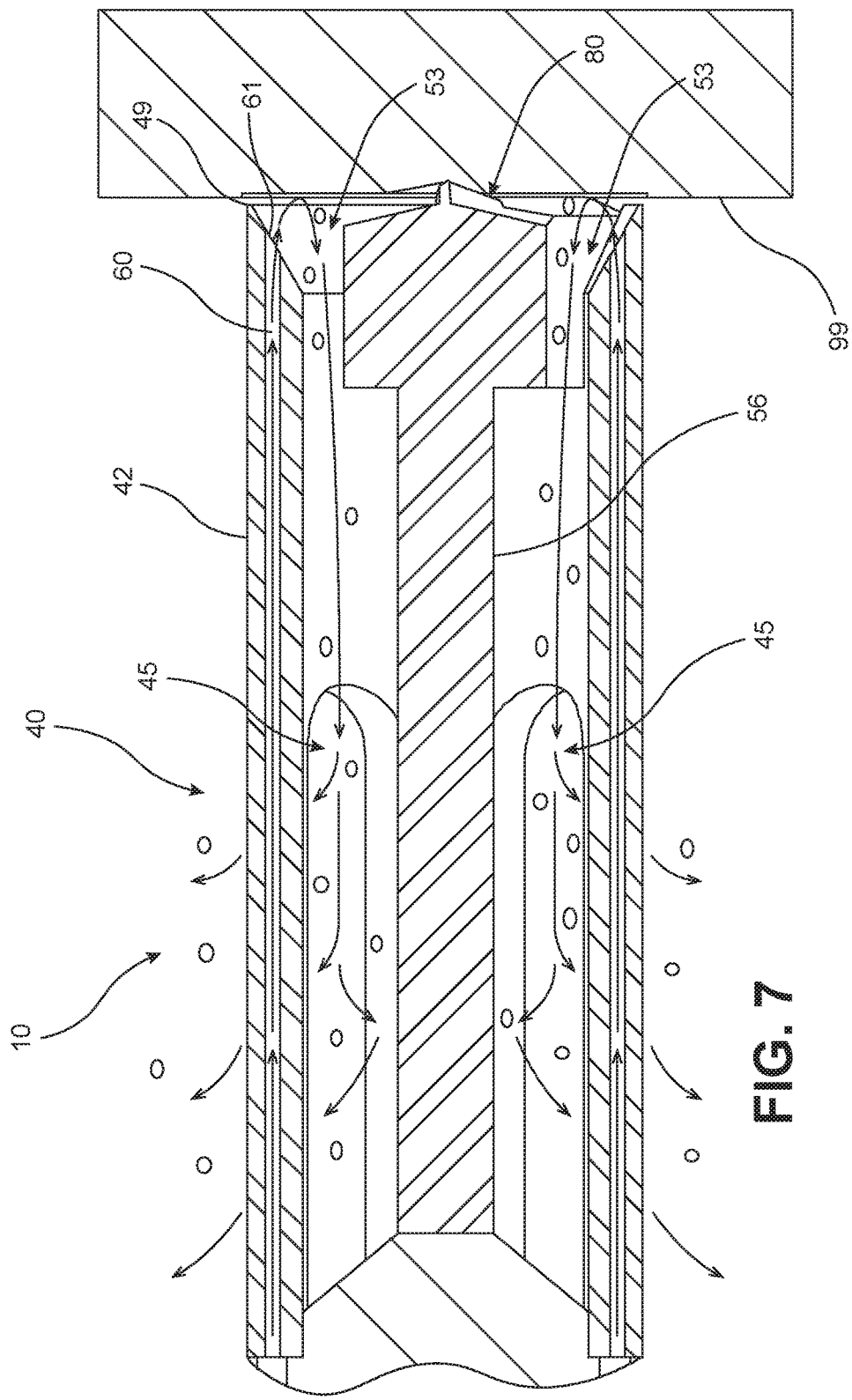

CHIP CONTROL TOOL

CROSS-REFERENCE TO RELATED APPLICATION

This application claims priority to U.S. Provisional Application Ser. No. 62/288,071, filed Jan. 28, 2016, the entire disclosure of which is hereby incorporated herein by reference.

FIELD OF THE INVENTION

The invention relates to a chip control feature of a machining tool. More specifically, the invention relates to a fluid initiated chip directing feature of a rotary cutting tool.

BACKGROUND OF THE INVENTION

An engine component of a motor vehicle often requires a machining operation for removing material from an exterior surface thereof. The machining operation may be performed on an engine block or a cylinder head, for example. Such machining operations may be performed with a polycrystalline diamond compact (PDC) cutting tool. The PDC cutting tool may include a cutting surface or edge disposed at an end of a cylindrical shaft rotated relative to a surface of the engine component in need of the machining operation.

It is common for the engine blocks or the cylinder heads to include water jacket openings adjacent portions of the engine block or the cylinder head requiring the machining operation, such as a facing operation, for example. Cutting chips formed during the machining operation may be undesirably projected away from the machining operation in a direction leading into the water jacket openings.

The engine components are typically cast wherein the interior surfaces thereof are relatively rough or textured, causing the cutting chips to become lodged within the interior of the engine block or the cylinder head. The cutting chips may eventually become loose within an assembled and operational engine, thereby presenting a substantial risk of the cutting chips propagating throughout the engine cooling system and damaging components of the engine cooling system such as the engine cooling water pump. Accordingly, a time consuming process of removing any cutting chips from within the interior of the engine block or cylinder head is required to prevent significant damage to the engine.

It would therefore be desirable to produce a rotary tool having a chip control feature configured to control a direction in which cutting chips formed during a machining operation are ejected away from the machining operation.

SUMMARY OF THE INVENTION

Compatible and attuned with the present invention, a rotary tool having a fluid initiated chip control feature has surprisingly been discovered.

In one embodiment of the invention, a rotary tool configured to rotate about a central rotational axis thereof during a machining operation on a workpiece comprises a cylindrical sleeve including a first opening formed in an outer circumferential surface thereof providing fluid communication between a hollow interior of the sleeve and an environment surrounding the sleeve. The sleeve includes a first flow passage formed therein terminating in a first fluid outlet formed in an open end of the sleeve. A cutting element of the rotary tool is disposed adjacent the open end of the sleeve. The first fluid outlet is configured to deliver a flow of a fluid toward the workpiece to cause chips formed during the machining operation to be directed away from the workpiece and out of the hollow interior of the sleeve through the first opening.

A method of controlling chips formed during a machining operation performed on a workpiece is also disclosed. The method includes the steps of: providing a rotary tool including a cylindrical sleeve and a cutting element, the sleeve including an opening formed in an outer circumferential surface thereof providing fluid communication between a hollow interior of the sleeve and a surrounding environment, the sleeve further including a flow passage formed therein terminating in a fluid outlet formed in an open end of the sleeve; performing a machining operation on the workpiece using the cutting element; and directing a flow of a fluid out of the fluid outlet and toward the workpiece within the hollow interior of the sleeve, the flow of the fluid rebounding off the workpiece to cause chips formed during the machining operation to be directed out of the hollow interior of the sleeve through the opening.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings:

FIG. 1 is side elevational view of a rotary tool according to an embodiment of the invention;

FIG. 2 is a front elevational view of the rotary tool illustrated in FIG. 1;

FIG. 3 is a perspective view of the rotary tool illustrated in FIGS. 1 and 2;

FIG. 4 is an enlarged fragmentary perspective view of a portion of the rotary tool surrounded by circle 4 of FIG. 3;

FIG. 5 is a cross-sectional side elevational view of the rotary tool taken through sections lines 5-5 of FIG. 2;

FIG. 6 is a cross-sectional side elevational view of the rotary tool taken through section lines 6-6 of FIG. 2; and FIG. 7 is an enlarged fragmentary cross-sectional view of the rotary tool illustrated in FIGS. 1-6 during a machining operation performed on a workpiece.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-7 illustrate a rotary tool 10 according to an embodiment of the invention. The rotary tool 10 includes a cylindrical body 20, a chip control portion 40, and a cutting element 80. The cylindrical body 20 extends longitudinally from a first end 21 to a second end 22 thereof. The first end 21 of the main body 20 includes a coupling portion 24. The coupling portion 24 is configured for coupling the rotary tool 10 to a powered rotary device (not shown) used to rotate the rotary tool 10 about a central rotational axis thereof. The powered rotary device may be any device capable of transferring rotational motion and torque to the rotary tool 10. The coupling portion 24 may for example be configured to couple the rotary tool 10 to a set of chuck jaws (not shown) or a similar coupling structure of the powered rotary device. The coupling portion 24 is shown as a substantially annular projection extending axially from the first end 21, but the coupling portion 24 may have any suitable structure for coupling the rotary tool 10 to the associated powered rotary device. Additionally, it should be understood that the coupling portion 24 may be configured for coupling the rotary tool 10 to any suitable structure or adapter associated with the powered rotary device without departing from the scope of the present invention.

The rotary tool 10 further includes a fluid delivery system 25, as best illustrated in FIGS. 5 and 6. The fluid delivery system 25 includes a fluid coupling 26 coupled to the first end 21 of the cylindrical body 20, an axially extending manifold conduit 30 extending along the central rotational axis of the rotary tool 10, a pair of radial flow passages 34 extending radially outwardly with respect to the axial manifold conduit 30, and a pair of axial flow passages 60, wherein each of the axial flow passages 60 extends axially from an end of a corresponding one of the radial flow passages 34.

The fluid coupling 26 provides fluid communication between the axial manifold conduit 30 and a fluid source (not shown) associated with the rotary tool 10. The fluid source may be configured to selectively deliver a fluid to the cutting element 80 of the rotary tool 10 during a machining operation thereof, as explained in greater detail hereinafter. The fluid coupling 26 may be a cylindrical member having a central bore 27 aligned with and fluidly coupled to the axial manifold conduit 30. The fluid coupling 26 may include an annular projection 28 disposed adjacent an end of the fluid coupling 26 engaging the cylindrical body 20. A first side of the annular projection 28 engages a first annular sealing member 3 and a second opposing side of the annular projection 28 engages a second annular sealing member 5. A cylindrical collar 7 having a threaded outer surface may then be rotated relative to a threaded inner surface of the cylindrical body 20 formed concentric with respect to the axial manifold conduit 30 to compress the first annular sealing member 3 between the collar 7 and the annular projection 28 and the second annular sealing member 5 between the annular projection 28 and a portion of the cylindrical body 20 adjacent the axial manifold conduit 30. Alternative structures for securing the fluid coupling 26 to the cylindrical body 20 may also be used without departing from the scope of the present invention.

The axial manifold conduit 30 extends from a first end 31 adjacent the fluid coupling 26 and terminates at a second end 32 adjacent the second end 22 of the cylindrical body 20. Each of the radial flow passages 34 is fluidly coupled to the axial manifold conduit 30 and extends radially outwardly from the second end 32 of the axial manifold conduit 30 toward an outer circumferential surface of the cylindrical body 20. The rotary tool 10 is illustrated in FIGS. 1-7 as including a pair of the radial flow passages 34 extending radially outwardly in diametrically opposed directions, but any number of the radial flow passages 34 with any suitable angular spacing therebetween may be used without departing from the scope of the present invention.

The chip control portion 40 of the rotary tool 10 includes a sleeve 42 and a central shaft 56. The sleeve 42 is formed by a cylindrical wall 50 formed concentrically with respect to the central rotational axis of the rotary tool 10. A first end 43 of the sleeve 42 engages the second end 22 of the cylindrical body 20 while an open second end 44 of the sleeve 42 is freely disposed and spaced from the cylindrical body 20. The cylindrical wall 50 includes an angled surface 47 connecting the inner circumferential surface 51 to the outer circumferential surface 52 thereof, thereby forming a frustoconical surface at the open second end 44 of the sleeve 42.

The sleeve 42 includes at least one opening 45 extending from the inner circumferential surface 51 of the wall 50 to the outer circumferential surface 52 thereof. Each of the openings 45 may be in the form of an axially extending slot 45, wherein each of the axially extending slots 45 provides fluid communication between a hollow interior 48 of the sleeve 42 and an environment surrounding the rotary tool 10. The axially extending slots 45 may be spaced apart a specified distance from the second end 44 of the sleeve 42, as desired, to ensure proper control of chips formed during a machining operation utilizing the rotary tool 10.

The central shaft 56 includes a first end 57 coupled to the second end 22 of the cylindrical body 20 and a second end 58 disposed adjacent and coupled to the cutting element 80. The cutting element 80 may be any suitable cutting element 80 for use with the rotary tool 10 based on a desired application of the rotary tool 10. The cutting element 80 may include any structure suitable for supporting a cutting surface 82 of the cutting element 80. The cutting element 80 may be formed integrally with the remainder of the sleeve 42 and the central shaft 56 or the cutting element 80 may be formed independently as a cartridge or insert configured for coupling to the rotary tool 10, as desired.

As illustrated in FIGS. 1-7, the cutting element 80 is disposed at the second end 58 of the central shaft 56 and further includes a pair of cross members 84 extending radially outwardly from the central shaft 56 to the second end 44 of the sleeve 42. The cutting surface 82 is shown as including each of a central pointed tip 85 aligned with the central shaft 56 and a pair of radially extending blades 86 supported by the cross members 84, wherein the radially extending blades 86 are arranged perpendicular with respect to the central rotational axis of the rotary tool 10. Although illustrated as having two of the cross members 84 and two of the cutting blades 86, the cutting element 80 may include any number of cross members 84 and cutting blades 86 without departing from the scope of the present invention. As best shown in FIG. 1, the cutting surface 82 extends axially beyond the second end 44 of the sleeve 42 to ensure that the cutting surface 82 engages the surface of the workpiece prior to the second end 44 of the sleeve 42.

The cutting surface 82 of the cutting element 80 may be formed from any material having a hardness suitable for performing a desired cutting or machining operation on the desired workpiece. The cutting surface 82 may accordingly be formed from polycrystalline diamond or carbide, as non-limiting examples. As should be understood, the selection of a suitable material for the cutting surface 82 is dependent on the material or materials forming the workpiece on which the desired machining operation is to be performed.

The cutting element 80 illustrated in FIGS. 1-7 is configured for performing either of a reaming operation and a facing operation on a workpiece, but other forms of cutting elements may be used without departing from the scope of the present invention. As non-limiting examples, the cutting element 80 may alternatively be suitable for performing drilling operations, boring operations, and the like without departing from the scope of the present invention.

Each of the axial flow passages 60 is an axially extending opening formed in the wall 50 of the sleeve 42 intermediate the inner circumferential surface 51 and the outer circumferential surface 52 thereof. As mentioned hereinabove, each of the axial flow passages 60 corresponds to and is fluidly coupled to one of the radial flow passages 34 formed in the cylindrical body 20. Each of the axial flow passages 60 may be disposed between adjacent ones of the axially extending slots 45 to allow the axial flow passages 60 to extend rectilinearly to the second end 44 of the sleeve 42. Each of the axial flow passages 60 extends along a length of the sleeve 42 and terminates at a fluid outlet 61 formed adjacent the cutting element 80.

Each of the fluid outlets 61 is an opening formed in the angled surface 47 of the wall 50 intermediate the inner circumferential surface 51 and the outer circumferential surface 52 thereof. The angled surface 47 accordingly allows for each of the fluid outlets 61 to be spaced in the radial direction and the axial direction of the rotary tool 10 from an edge 49 formed between the angled surface 47 and the outer circumferential surface 52 of the wall 50. Each of the fluid outlets 61 is configured to direct a flow of a fluid flowing through the fluid outlet 61 in an axial direction of the rotary tool 10 towards the portion of the cutting surface 82 corresponding to each of the fluid outlets 61, such as one of the blades 86 formed adjacent to each of the fluid outlets 61. As shown in FIGS. 6 and 7, the formation of each of the fluid outlets 61 within the angled surface 37 causes the fluid outlet 61 to at least partially face in a direction towards the central rotational axis of the rotary tool 10, thereby causing at least a portion of the fluid exiting the fluid outlet 61 to initially flow in the radially inward direction of the rotary tool 10.

The second end 44 of the sleeve 42 includes at least one opening 53 fluidly coupling the hollow interior 48 of the sleeve 42 to the ambient environment surrounding the rotary tool 10. As illustrated in FIGS. 2-4, the at least one opening 53 may be a pair of substantially semi-circular openings formed by the cooperation of the angled surface 47 at the second end 44 of the sleeve 42 and each of the cross members 84 having one of the cutting blades 86 disposed thereon. However, the at least one opening 53 may be formed by any cooperating structures of the sleeve 42 and the cutting element 80 depending on the form and configuration of the cutting element 80, as desired, so long as the at least one opening 53 provides fluid access to the hollow interior 48 of the sleeve 42 when the fluid approaches the sleeve 42 in an axial direction thereof.

FIG. 7 illustrates the rotary tool 10 when performing a machining operation on a workpiece 99. The cutting surface 82 of the rotary tool 10 is shown as contacting a substantially planar face of the workpiece 99 for generally disclosing the method of operation of the chip control portion 40 of the rotary tool 10, but one skilled in the art should appreciate that the rotary tool 10 may be adapted for use in any number of machining operations without altering the manner in which the rotary tool 10 beneficially redirects chips formed during the corresponding machining operation. For example, the cutting surface 82 of the rotary tool 10 may be used in a reaming operation wherein the cutting surface 82 engages and removes material from an inner circumferential surface of a bore or opening formed in the corresponding workpiece. The cutting surface 82 may alternatively be used in a facing operation wherein the cutting surface 82 is received within an existing opening or bore formed in the workpiece and used to form a planar surface within the opening or bore at a position spaced from the outermost surface of the workpiece. The rotary tool 10 is therefore generally used to perform machining operations wherein the fluid outlets 61 of the sleeve 42 direct the flow of the fluid towards the workpiece in a manner wherein the greatest available flow path for the fluid to exit the hollow interior 48 of the sleeve 42 after striking a surface of the workpiece is through the axially extending slots 45 formed in the sleeve 42. The rotary tool 10 is accordingly suited for machining operations wherein the central rotational axis of the rotary tool 10 is pointed towards a surface of the workpiece arranged perpendicular thereto for redirecting the chips in a rearward direction of the sleeve 42 towards the slots 45 thereof.

The rotary tool 10 is first coupled to a powered rotary device via the coupling portion 24 of the cylindrical body 20. The fluid coupling 26 is mated with a corresponding structure of the powered rotary device to establish fluid communication between the fluid delivery system 25 and a fluid source associated with the powered rotary device. During operation of the powered rotary device, rotational motion and torque is transferred from the powered rotary device to the rotary tool 10 to cause the entirety of the rotary tool 10 to rotate about the central rotational axis thereof.

The rotation of the rotary tool 10 causes the cutting element 80 to move relative to the workpiece 99. The cutting surface 82 of the cutting element 80 is then brought into contact with the desired surface of the workpiece 99 to conduct the desired machining operation. Heat is generated when the cutting surface 82 engages the workpiece 99 as a result of the frictional forces formed between the cutting surface 82 and the workpiece 99. Accordingly, it is often desirable to remove the heat from the intersection of the cutting surface 82 and the workpiece 99 to prevent potential damage to the workpiece 99 or the cutting element 80. Additionally, in some machining operations it is also beneficial to lubricate the intersection of the cutting element 80 and the workpiece 99 to further prevent the formation of heat or to prevent damage to the cutting element 80 or the workpiece 99.

One traditional method of preventing the formation of heat during the machining operation is to flood the intersection of the cutting surface 82 and the workpiece with a traditional metal working fluid acting as a coolant. Many traditional machining operations utilize a "wet machining" process that requires the application of a large quantity of a liquid lubricating coolant to an interface between the cutting surface and the workpiece. Such machining operations may include milling, drilling, tapping, and finish machining, for example. The lubricating coolant used may be water or oil-based, and such machining processes may require the delivery of several gallons per hour of the lubricating coolant to the cutting surface to maintain a thermal stability of the machine tooling and the workpiece.

In other instances, a form of minimum quantity lubrication (MQL) machining may be employed. An MQL machining operation is a nearly dry machining operation that uses a small quantity of a lubricant, such as vegetable or ester-based oil, mixed with a gas, such as air, to form an aerosol for lubricating the cutting surface and the workpiece. MQL machining requires only milliliters of lubricant to be delivered to the cutting surface of the tool per hour as opposed to gallons of coolant per hour associated with a wet machining process.

The fluid for use with the rotary tool 10 is accordingly selected based on the type of machining operation to be performed with the rotary tool 10. The fluid may be any fluid having the desired thermal transfer and lubricating characteristics that is also capable of being transported through the fluid delivery system 25 of the rotary tool 10. The type of fluid to be used when operating the rotary tool 10 may be dependent on the material forming the cutting element 80 of the rotary tool 10, the material forming the workpiece, the type of cutting element 80 suitable for the desired machining operation, the desired machining operation to be performed, and the parameters of the machining operation to be performed, as non-limiting examples.

If the rotary tool 10 is configured for use in a traditional wet machining operation utilizing a flooding of the liquid lubricating coolant, the fluid delivery system 25 of the rotary tool 10 may be in fluid communication with a source of liquid lubricating coolant. If the rotary tool 10 is configured for use in an MQL machining operation, the fluid delivery system 25 of the rotary tool 10 may instead be in fluid communication with a source of a gaseous fluid mixture such as a lubricating aerosol.

During the machining operation, the intersection of the cutting element 80 and the workpiece 99 continually produces a quantity of the chips of the workpiece 99 regardless of the type of machining operation utilized. The chips that are ejected away from the machining operation may undesirably be ejected into an opening or other structural feature of the workpiece 99. It is therefore desirable to control a direction in which the chips are ejected during use of the rotary tool 10.

During a machining operation performed by the rotary tool 10, the fluid in communication with the fluid delivery system 25 is caused to flow sequentially through the fluid coupling 26, the axial manifold conduit 30, each of the radial flow passages 34, and each of the axial flow passages 60 before being ejected from each of the fluid outlets 61. The fluid outlets 61 are directed toward the machining operation in a manner wherein the flow of the fluid strikes a surface of the workpiece 99 arranged transversely to the central rotational axis of the rotary tool 10. The fluid strikes the surface of the workpiece 99 to cause the fluid to be redirected in a direction back toward the chip control portion 40 of the rotary tool 10. Additionally, the close spacing of the edge 49 of the sleeve 42 from the surface of the workpiece 99 results in the hollow interior 48 and the axially extending slots 45 of the sleeve 42 cooperating to form a flow path for the fluid having the largest cross-sectional flow area, thereby promoting the fluid flowing back towards the slots 45 when the fluid is continually delivered towards the workpiece 99 in order to equalize the pressure of the fluid experienced within the sleeve 42.

The fluid then flows into the hollow interior 48 of the sleeve 42 via the at least one opening 53 formed in the second end 44 thereof after first striking the workpiece 99. As the fluid strikes the surface of the workpiece 99, the continually formed supply of chips are similarly caused to be directed away from the surface of the workpiece 99 and toward the at least one opening 53 to cause the chips to enter the hollow interior 48 of the sleeve 42. Both the fluid and the chips are then able to be ejected from the sleeve 42 via the at least one axially extending slot 45 formed therein and spaced apart from the cutting surface 82. Accordingly, the chip control portion 40 causes the chips to be ejected away from the machining operation in a direction away from the workpiece 99 on which the machining operation is being performed, thereby eliminating the threat of the chips being ejected in an undesirable direction, such as toward the workpiece 99.

The angled surface 47 of the wall 50 further aids in redirecting any chips that are flowing from the workpiece and towards the rotary tool 10 towards the central rotational axis of the rotary tool 10. For example, the axially directed portion of the fluid that strikes the workpiece may bounce off of the workpiece and then be redirected towards the angled surface 47. The angled surface 47 then directs the fluid back in the radial inward direction due to the transverse arrangement of the angled surface 47 relative to the central rotational axis of the rotary tool 10. The manner in which each of the fluid outlets 61 is formed in the angled surface 47 further causes the fluid exiting each of the fluid outlets 61 to be directed at least partially in the radial inward direction of the rotary tool 10 due to the resulting orientation of each of the fluid outlets 61, thereby reducing the risk of the cutting chips being directed away from the workpiece in a radial outward direction beyond the edge 49 formed at the second end 44 of the sleeve 42.

As the chips flow backwards towards the axially extending slots 45 the rotation of the rotary tool 10 about the central rotational axis thereof further promotes the movement of the chips in the radially outward direction due to the centrifugal forces experienced by the chips within the hollow interior 48 of the sleeve 42. Furthermore, the central shaft 56 provides a cylindrical surface disposed between the axially extending slots 45 suitable for further deflecting any chips striking the central shaft 56 in the radial outward direction to ensure that the chips are ejected from one of the axially extending slots 45.

The rotary tool 10 having the chip control portion 40 accordingly provides numerous advantageous features. The edge 49 formed at the second end 44 of the sleeve 42 is positioned axially relative to the cutting surface 82 to ensure that the sleeve 42 does not encounter the workpiece while retaining a close enough spacing from the workpiece to ensure that the chips removed by the cutting surface 82 do not escape the hollow interior 48 of the sleeve 42 beyond the edge 49. The inclusion of the frustoconical surface formed by the angled surface 47 at the end of the wall 50 aids in spacing each of the fluid outlets 61 from the workpiece while also directing at least a portion of the fluid radially inwardly to promote the backwards flow of the chips towards the axially extending slots 45. The angled relationship of the angled surface 47 relative to the central rotational axis of the rotary tool 10 further aids in ensuring that the redirected fluid that has rebounded off of the workpiece is further directed in the radial inward direction when striking the angled surface 47 to promote the flow of the chips towards the slots 45 instead of towards the edge 49. The spacing of the slots 45 from the second end 44 of the sleeve 42 allows for the chips to be removed from the hollow interior 48 of the sleeve 42 at a specified distance from the workpiece to ensure that the chips are not ejected in an undesirable direction.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A rotary tool configured to rotate about a central rotational axis thereof during a machining operation on a workpiece, the rotary tool comprising:
 a cylindrical sleeve including an outer wall defining a hollow interior therein and a first opening formed in the wall and providing fluid communication between the hollow interior of the sleeve and an environment surrounding the sleeve, wherein an end of the wall at an open end of the sleeve that is open to the hollow interior has an angled surface that is circumferentially disposed around the sleeve and is arranged transverse to the central rotational axis of the rotary tool, the sleeve further including a first flow passage extending along a length of the sleeve through the wall and terminating as a first fluid outlet in the angled surface, wherein the first fluid outlet faces at least partially towards the central rotational axis of the rotary tool; and a cutting element disposed adjacent the open end of the sleeve, wherein the first fluid outlet is configured to deliver a flow of a fluid toward the workpiece to cause chips formed during the machining operation to be directed away from the workpiece and out of the hollow interior of the sleeve through the first opening.

2. The rotary tool of claim 1, wherein the cutting element is disposed at an end of a shaft extending along the central rotational axis of the rotary tool.

3. The rotary tool of claim 1, wherein the fluid flows through the first flow passage in a direction parallel to the central rotational axis of the rotary tool and towards the workpiece.

4. The rotary tool of claim 3, wherein the flow of the fluid is configured to direct the chips away from the workpiece in a direction opposite the direction of the flow of the fluid through the first flow passage and towards the first opening.

5. The rotary tool of claim 1, wherein a cutting surface of the cutting element is spaced in an axial direction of the sleeve from the open end of the sleeve.

6. The rotary tool of claim 1, wherein the cutting element is coupled to the open end of the sleeve.

7. The rotary tool of claim 6, wherein a cutting surface of the cutting element extends in a radial direction of the rotary tool perpendicular to the central rotational axis thereof.

8. The rotary tool of claim 7, wherein the first fluid outlet is formed in the open end of the sleeve lateral to the cutting surface.

9. The rotary tool of claim 1, further including a body coupled to the sleeve, the body including a manifold conduit extending along the central rotational axis of the rotary tool and a second flow passage extending radially outwardly from the manifold conduit providing fluid communication between the manifold conduit and the first flow passage.

10. The rotary tool of claim 9, wherein the sleeve includes a third flow passage formed therein terminating at a second fluid outlet formed in the open end of the sleeve and the body includes a fourth flow passage extending radially outwardly from the manifold conduit providing fluid communication between the manifold conduit and the third flow passage.

11. The rotary tool of claim 1, wherein the fluid is a liquid coolant used in a wet machining operation.

12. The rotary tool of claim 1, wherein the fluid is an aerosol used in an MQL machining operation.

13. The rotary tool of claim 1, wherein a second opening formed in the outer circumferential surface of the sleeve provides fluid communication between the hollow interior of the sleeve and the environment, wherein the first flow passage is disposed intermediate the first opening and the second opening.

14. The rotary tool of claim 1, wherein the first opening is a slot extending longitudinally in a direction parallel to the central rotational axis of the rotary tool.

15. The rotary tool of claim 1, wherein a cutting surface of the cutting element is formed from one of polycrystalline diamond or carbide.

16. A method of controlling chips formed during a machining operation performed on a workpiece, the method including the steps of:

providing a rotary tool including a cylindrical sleeve and a cutting element, the sleeve including an outer wall defining a hollow interior therein and an opening formed in the wall and providing fluid communication between the hollow interior of the sleeve and a surrounding environment, wherein an end of the wall at an open end of the sleeve that is open to the hollow interior has an angled surface that is circumferentially disposed around the sleeve and is arranged transverse to a central rotational axis of the rotary tool, the sleeve further including a flow passage extending along a length of the sleeve through the wall and terminating as a fluid outlet in the angled surface, wherein the fluid outlet faces at least partially towards the central rotational axis of the rotary tool;

performing a machining operation on the workpiece using the cutting element; and directing a flow of a fluid out of the fluid outlet and toward the workpiece within the hollow interior of the sleeve, the flow of the fluid rebounding off the workpiece to cause chips formed during the machining operation to be directed out of the hollow interior of the sleeve through the opening.

* * * * *